United States Patent [19]

Hespenheide

[11] 3,803,638

[45] Apr. 9, 1974

[54] RECORDING SYSTEM USING MAGNETIC CORE MATRIX

[75] Inventor: Wilbur G. Hespenheide, Westlake Village, Calif.

[73] Assignee: Xerox Corporation, Rochester, N.Y.

[22] Filed: Apr. 18, 1969

[21] Appl. No.: 817,459

[52] U.S. Cl. ........................ 346/74 MC, 346/74 MP
[51] Int. Cl. ............................................ G11b 5/20
[58] Field of Search ....... 346/74 M, 74 MP, 74 MC, 346/74 ES, 74 ES.X; 340/174.1 F;179/100.2 C

[56] References Cited

UNITED STATES PATENTS

| | | | |
|---|---|---|---|
| 2,677,019 | 4/1954 | Bohrendorf | 179/100.2 |
| 2,820,956 | 1/1958 | Rueger | 346/74 |
| 2,879,340 | 3/1959 | Starr, Jr. | 179/100.2 |
| 3,012,839 | 12/1961 | Epstein et al. | 346/74 |
| 2,408,117 | 9/1946 | Young | 346/74 |
| 3,142,840 | 7/1964 | Smith et al. | 346/74 |
| 3,349,382 | 10/1967 | Naylor et al. | 340/174.1 |
| 3,378,647 | 5/1968 | Hirota | 340/174.1 |
| 3,386,101 | 5/1968 | Sims, Jr. | 346/74 |
| 3,441,938 | 4/1969 | Markgraf | 346/74 |

*Primary Examiner*—Vincent P. Canney

[57] ABSTRACT

A recording system wherein certain ones of a $n$ by $m$ matrix of magnetic cores are excited in common by a character select wire. Each core of the matrix has associated therewith a shorted electrically conductive loop which passes through the core's center and partially encircles the core and is closely adjacent a magnetic recording medium which passes thereby. As each core is excited, a current is induced in the loop which in turn generates a magnetic field at the surface of the magnetic medium which stores this field activity as a magnetic pattern or dot. As a group of cores in a character or symbol configuration are excited, a corresponding configuration is stored on the moving magnetic medium. This pattern is then detected by a transducer unit and converted into a series of parallel pulse trains which are supplied to a recording station where a visible pattern is produced corresponding to the original configuration.

9 Claims, 2 Drawing Figures

PATENTED APR 9 1974 3,803,638

INVENTOR.
WILBUR G. HESPENHEIDE
BY John E. Beck
ATTORNEY

RECORDING SYSTEM USING MAGNETIC CORE MATRIX

This invention relates to a recording system generally, and particularly to such a system employing a buffer or storage stage.

In low cost recording systems there exists a continuing struggle between efficiency or quality performance and cost. One area of quality performance is the speed at which information can be received and still be faithfully recorded. With the advent of smaller and less expensive computers in wide-spread applications, data rates approaching typical computer speeds must be considered in the design of recording systems. Generally such compatability between high data rates and low cost recording systems is achieved by the use of buffering. However, core or drum memories are expensive and incorporation of such expedients augment the cost of any recording system.

Therefore, it is an object of the present invention to provide a novel recording system.

Another object of the present invention is to improve the effectiveness of low cost recording systems.

A further object of the present invention is to provide a novel buffer to a recording system.

These and other objects which may become apparent are accomplished in accordance with the principles of the present invention wherein certain ones of a n by m matrix of magnetic cores are excited in common by a character select wire. Each core of the matrix has associated therewith a shorted conductive loop which encircles the core and is closely adjacent a magnetic recording medium which passes thereby. As each core is excited, a current is induced in the loop which in turn generates a magnetic field at the surface of the magnetic medium which stores this field activity as a latent magnetic pattern or dot. As a group of cores in a character or symbol configuration are excited, a corresponding latent configuration is stored on the moving magnetic medium. This latent pattern is then detected by a transducer unit and converted into a series of parallel pulse trains which are supplied to a recording station where a visible pattern is produced corresponding to the original configuration.

Other features and objects of the present invention may be apparent from the following detailed description when read in connection with the attached drawings wherein.

Figure 1:
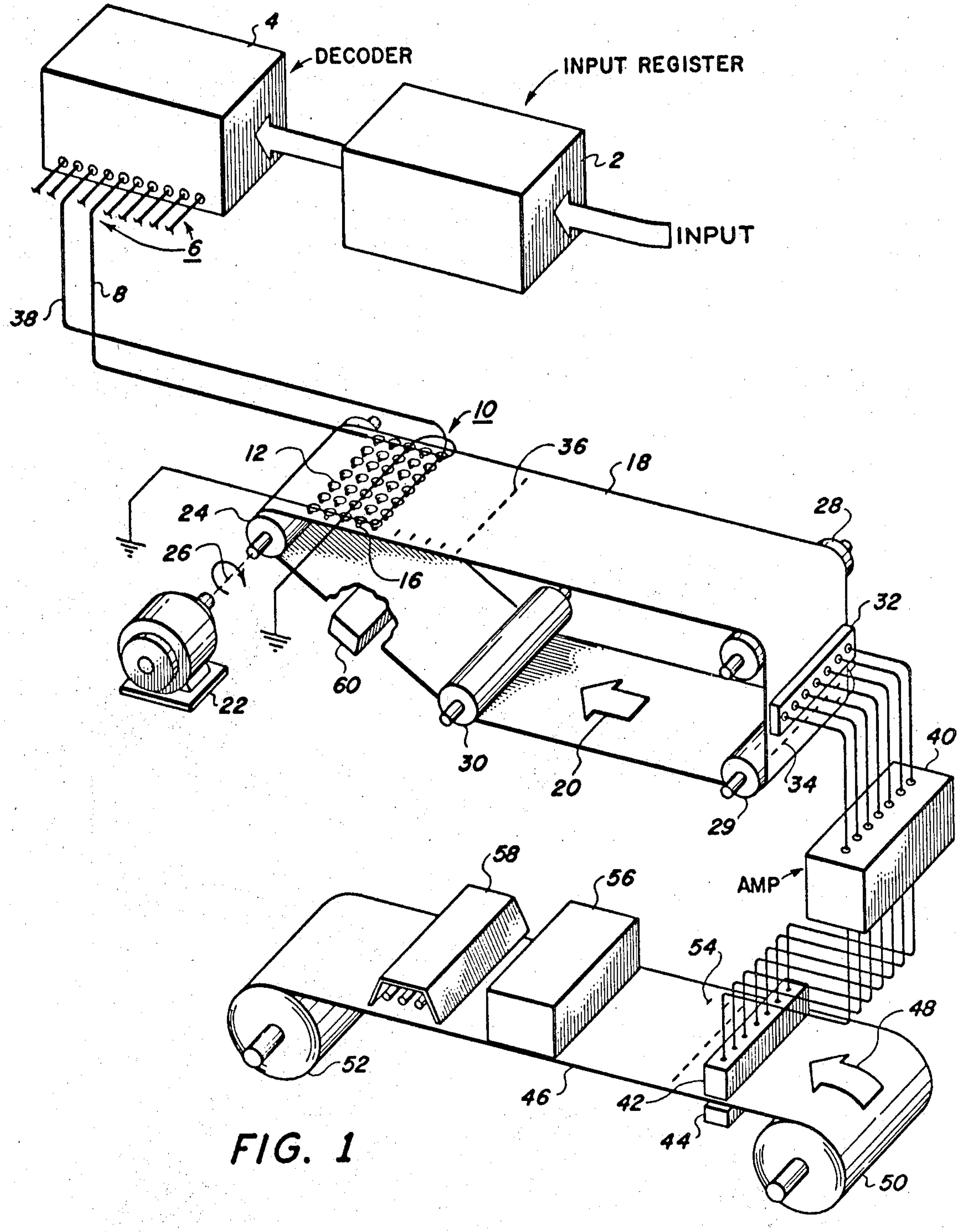
FIG. 1 is a perspective illustration of the present invention.

The information data input to the system of FIG. 1 is received by an input register 2 which may be of any conventional design to accommodate the particular form taken by the received data. For purposes of this description, it may be assumed that this information represents alphanumeric symbols employing standard ASCII code. Such coded alphanumeric information is then supplied to a conventional decoder unit 4, such as Type 4161 sold by the Digital Equipment Corporation, which converts the ASCII code into a signal at any one of the outputs 6 representative of the particular alphanumeric signal transmitted. For each possible symbol there is one output 6 from the decoder 4. Therefore, for the output 6 associated with character select wire 8, the alphanumeric symbol "T" is associated therewith. As is shown, this character select wire 8 passes through one row and one column of the magnetic core matrix generally referred to by reference numeral 10. This particular row and column are spatially related to represent the symbol "T."

Figure 2:
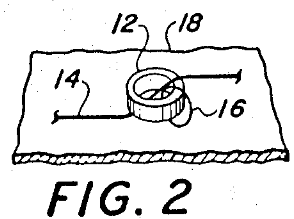
FIG. 2 shows a detailed view of one of the matrix cores as used in the invention.

Referring now to FIG. 2 as well as FIG. 1, the core matrix is comprised of m rows and n columns. In FIG. 1, a thirty-five core matrix is shown while it may be realized that larger or smaller core matrices may be similarly employed. Fig. 2 shows a single magnetic core 12 having a character select line 14 passing therethrough. Also associated with the magnetic core 12 is a shorted conductive loop 16 which encircles the core. Closely adjacent to the loop 16 there is represented a magnetic recording medium 18 which bears the same reference numeral in FIG. 1. This magnetic recording medium is moved in a direction indicated by the arrow 20 by a suitable motor 22 mechanically coupled to a drive roller 24 via linkage 26 represented by a broken line. Idle rollers 28, 29, and 30 are suitably provided inside the magnetic recording belt 18 to define a path through which motor 22 drives the belt. Downstream in the path of the belt's movement from the core matrix 10 there is located intermediate rollers 28 and 29 a transducer unit or read head 32 comprising actually seven read heads. Each read head corresponds to one of the seven rows of the matrix 10 and is aligned therewith.

As the input register 2 and decoder 4 receive information and convert information into a pulse on one of the character select wires, for example 8, a selected group of the magnetic cores in the matrix 10 are excited. The result of this exciting pulse through the character select wire to ground is such as to generate magnetic flux substantially within the core material itself. As this flux passes through the shorted conductive loop 16, a current is induced therein. This current, in turn, generates a magnetic flux field about the shorted turn which is effective to provide a magnetic pattern on the surface of the magnetic belt 18.

Using the letter "T" as the first letter or alphanumeric symbol received by this system, FIG. 1 represents the state of the system after two alphanumeric symbols have been received and decoded. The first letter has been decoded and a magnetic image corresponding to the configuration of the letter "T" has been recorded and is presently being read by the read heads 32 as shown in FIG. 1. The magnetic image corresponding to this letter is designated by reference numeral 34.

Shortly before a magnetic image 34 reached the read out unit 32, another magnetic image 36 was recorded by the closed loops associated with those magnetic cores corresponding to the alphanumeric symbol "L." The recording of this image 36 resulted when the decoder 4 indicated the conversion of the contents of input register 2 by applying a pulse on character select wire 38. This character slect wire interweaves a column and a row of cores in matrix 10 corresponding to the letter "L." It may be noted that the pattern 36 is a reverse image of the selected character "L." This is necessary as will be seen hereinafter in order to provide right-reading image at the recording station.

Referring now to the read out station represented by the transducer unit 32, each recording head in this unit is coupled to suitable amplifiers 40 which amplify the pulse generated by the read out head and translate this amplified pulse to a recording assembly 42. This recording assembly may be represented by a plurality of electrographic recording styli corresponding in number to the number of rows in the matrix 10. As each recorded dot in the image 34 is detected by one of the read out heads, a styli in the recording assembly 42 corresponding to that read out head is energized. This energized styli cooperates with the backing electrode 44 to deposit a latent electrostatic dot onto a suitable electrographic recording medium 46 in accordance with conventional electrography. This recording medium is moving in a direction as indicated by the arrow 48 from a supply roll 50 to a takeup roll 52. The motive means for these rolls may originate from motor 22 or may be supplied by an independent motive source.

As the magnetic image 34 is detected by the transducer unit 32, a corresponding electrostatic latent image 54 is recorded on the electrographic medium 46. As this medium is moved, the image 54 may be developed in a conventional manner at a developer station 56 which renders the latent electrostatic image visible by adhering thereto finely divided thermoplastic marking particles or toner. Such toners are commonly used in electrographic and electrophotographic recording systems. A conventional flash fuser 58 further downstream from the developer 56 may be employed to permanently fix the developed latent image rendering a permanent visible recording of the symbol represented by the originally received coded data at the input of register 2.

Asociated with the magnetic recording belt 18 is an erase unit 60 which may be of conventional design to erase the magnetic images after they have been detected by the transducer unit 32. In this manner the magnetic belt 18 is prepared to receive additional recordings as the belt passes under matrix 10.

The magnetic cores utilizes in the matrix 10 may be conventional bimagnetic cores made of ferrite. Of course, other suitable materials may be utilized. If a conventional bimagnetic core is employed, the characteristic of the pulse generated by decoder 4 and provided to the character select wires must be of such a level as to fail to switch the magnetic core from its initial state to its other state. In this manner, a predetermined amount of magnetic flux will be generated during the pulse on the character select wire but when the pulse is terminated the magnetic core will return to its initial magnetic condition. by using an insufficient amount of excitation current, the particular core will not have to be erased or returned to its initial condition by another pulse. Alternatively, a linear magnetic core may be employed. Such a core may be compared to a monostable multivibrator where the conventional bimagnetic core is comparable to a flip-flop. Such a linear core will generate magnetic flux for the duration of the excitation pulse on the character select wire and therefore, during this pulse the magnetic belt will sense the flux passing through its surface and record this flux activity in the form of a magnetic image. The characteristic of this flux so generated is pulse-like in that the flux builds up to a predetermined amount depending upon the value of the current flowing in the character select wire and then rapidly decreases to zero after the pulse has been terminated. The initial magnetic condition of the core is reassumed after the pulse has ended so that erasure of an intermediate magnetic condition on the part of the core is obviated.

It may be realized that the concepts of the present invention are not limited to the use of an endless magnetic belt as a recording medium since such a belt may be replaced by a magnetic storage drum. In such an event, the matrix 10 may be arcuate to place the conductive loops 16 an equal distance from the drum's surface.

Similarly, a magnetic disc may be employed as the magnetic storage medium with a modification in the configuration of the core matrix such that each column is aligned on a radian of the disc while the read head is also aligned with a radian of the disc.

While FIG. 1 and the above description describe a final recording station utilizing electrography, the present invention is not limited to a particular type of final recording. For instance, a current sensitive recording medium may be employed to selectively pass current thereby discoloring the medium. Furthermore, even a xerographic belt employing a photoconductive layer on a conductive substrate may be used in accordance with standard xerographic techniques. In such a situation, the styli in the recording assembly 42 may be replaced by suitably actuated light sources for selective discharging of the xerographic belt. Again, in a xerographic situation, the recording medium need not be limited to a flexible belt and may comprise a rotating disc or drum as well.

While the more advantageous aspects of the present invention has been seen from the above description, it should be realized that the desired resolution of the final recorded image need not correspond to the resolution achieved by the magnetic image on the belt 18. The cores in matrix 10 while preferrably being equally spaced from adjacent cores may have a spacing above the desired resolution in the final recording. If such is the case, it is only necessary to space the styli in recording assembly 42 to whatever the desired resolution may be and connect the styli to individual ones of reading heads 32 which should be in alignment with the rows of the matrix.

While a novel and improved recording system has been disclosed utilizing an efficient and inexpensive buffer unit, the combination of the core matrix and the associated shorted conductive loops may provide in themselves a novel and improved recording system. In such a situation, the magnetic image on the belt 18 may be suitably developed utilizing magnetic toner of any conventional design. After development, the images may be transferred to a suitable receptor or fixed directly onto the surface of the belt 18. Therefore, other applications are possible for the system described hereinabove without the additional detection of the magnetic image and subsequent electrographic recording.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teaching of the present invention without departing from its essential teachings.

What is claimed is:

1. A recording system comprising:

a plurality of $m \times n$ magnetic cores spatially arranged in a matrix where $m$ and $n$ are integers and represent the number of cores in a row and column, respectively;

a plurality of character select wires, each one of which interweaves a certain number of said cores in a predetermined configuration representative of a particular symbol to be recorded;

pulse means for selectively energizing one of said character select wires;

a plurality of closed conductive loops, each of said loops associated with a respective one of said cores in such a manner as to encircle a net amount of magnetic flux generated in said respected one of said cores, said loops being responsive to said magnetic flux to generate a magnetic flux field;

a magnetic recording medium having a surface positioned substantially equidistant from said loops, said medium being responsive to said magnetic flux field to retain a magnetic image representative of the configuration of said cores interweaved by an energized character select wire;

motive means for moving said magnetic image through a path;

transducer means positioned along said path and spaced from said matrix for producing a series of pulse trains representative of said magnetic image; and recording means responsive to said pulse trains for producing a visible image representative of said magnetic image.

2. A recording system as defined in claim 1 wherein said transducer means includes one magnetic read head for each row of cores in said matrix, each read head being spaced from adjacent read heads as each row of cores is spaced from adjacent rows of cores.

3. A recording system as defined in claim 2 wherein said magnetic cores are linear magnetic cores.

4. A recording system as defined in claim 2 wherein said recording means includes:

a plurality of recording units equal in number to the plurality of magnetic read heads, each one of said recording units coupled to the output of one of said read heads and having a spatial relationship with adjacent recording units proportional to the spatial relationship of adjacent read heads.

5. A recording system comprising:

means for magnetically generating flux patterns in image configuration;

a magnetic recording medium responsive to said magnetic flux pattern generating means for temporarily retaining magnetic images;

means for moving said magnetic recording medium to thereby reposition said magnetic images from a position opposite said magnetic flux pattern generating means to a position opposite transducer means;

transducer means disposed along the path of movement of said magnetic recording medium for generating pulse trains corresponding to said magnetic images, and recording means responsive to said pulse strains for producing visible images representative of said magnetic images.

6. Apparatus according to claim 5, wherein said transducer means comprises magnetic read heads and said recording means comprises electrographic recording styli.

7. Apparatus according to claim 5 wherein said means for magnetically generating flux patterns comprises a plurality of $m \times n$ magnetic cores spatially arranged in a matrix where m and n are integers and represent the number of cores in a row and column, respectively, and a plurality of character select wires, each one of which interweaves a certain number of said cores in a predetermined configuration representative of a particular image to be recorded and pulse means for selectively energizing one of said character select wires, said magnetic flux pattern generating means further comprising a plurality of closed conductive loops, each of said loops loosely encircling a respective one of said cores in such a manner as to encircle a net amount of magnetic flux generated in said respective one of said cores, said loops being responsive to said magnetic flux to generate a magnetic flux field.

8. Apparatus according to claim 7 wherein said transducer means includes one magnetic read head for each row of cores in said matrix, each read head being spaced from adjacent read heads as each row of cores is spaced from adjacent rows of cores.

9. Apparatus according to claim 8 wherein said recording means includes, a plurality of recording units equal in number to the plurality of magnetic read heads, each one of said recording units coupled to the output of one of said read heads and having a spatial relationship with adjacent recording units proportional to the spatial relationship of adjacent read heads.

* * * * *